US009987566B2

(12) United States Patent
Glüer et al.

(10) Patent No.: US 9,987,566 B2
(45) Date of Patent: Jun. 5, 2018

(54) HYBRID CONTACT TRAY FOR A MASS TRANSFER COLUMN

(71) Applicant: Sulzer Chemtech AG, Winterthur (CH)

(72) Inventors: Sven Glüer, Zürich (CH); Mark William Pilling, Jenks, OK (US); Peter Mervyn Wilkinson, BT Amsterdam (NL)

(73) Assignee: Sulzer Chemtech AG, Winterthur (CH)

( * ) Notice: Subject to any disclaimer, the term of this patent is extended or adjusted under 35 U.S.C. 154(b) by 279 days.

(21) Appl. No.: 14/760,086

(22) PCT Filed: Jan. 16, 2014

(86) PCT No.: PCT/EP2014/050791

§ 371 (c)(1),
(2) Date: Jul. 9, 2015

(87) PCT Pub. No.: WO2014/111460

PCT Pub. Date: Jul. 24, 2014

(65) Prior Publication Data

US 2015/0352462 A1 Dec. 10, 2015

Related U.S. Application Data

(60) Provisional application No. 61/753,151, filed on Jan. 16, 2013.

(51) Int. Cl.
*B01F 3/04* (2006.01)
*B01D 3/22* (2006.01)
(Continued)

(52) U.S. Cl.
CPC ............... *B01D 3/225* (2013.01); *B01D 3/20* (2013.01); *B01D 3/205* (2013.01); *B01D 3/24* (2013.01);
(Continued)

(58) Field of Classification Search
CPC .......... B01D 3/20; B01D 3/205; B01D 3/225; B01D 3/24; B01D 3/30; B01D 3/324; B01F 3/04262; B01F 3/04496; B01F 3/04836
(Continued)

(56) References Cited

U.S. PATENT DOCUMENTS 3,584,844 A 6/1971 Papp
3,972,966 A * 8/1976 Lund .................... G01N 25/145 137/138
(Continued)

FOREIGN PATENT DOCUMENTS

CH 363643 A 8/1962
WO 99/03554 A1 1/1999

*Primary Examiner* — Charles Bushey
(74) *Attorney, Agent, or Firm* — Larson & Anderson, LLC

(57) ABSTRACT

A hybrid contact tray for a mass transfer column is provided. The contact tray includes a tray deck for passage of liquid along a liquid flow path thereon. The tray deck has a plurality of orifices for passage of ascending vapor through the tray deck, a cross-current vapor-liquid mixing section having a first portion of the plurality of orifices, and a co-current vapor-liquid mixing section including at least one co-current mixing device associated with a second portion of the plurality of orifices. The tray deck also has features capable of altering liquid head levels with respect to the plurality of orifices such that the liquid head level within the co-current vapor-liquid mixing section is greater than the liquid head level within the cross-current vapor-liquid mixing section.

19 Claims, 11 Drawing Sheets

Liquid
Flow path
401
417
409
409
402
415
417
415
440
441
405
411
420
411
420
421
413
413
421
407

(51) Int. Cl.
*B01D 3/20* (2006.01)
*B01D 3/24* (2006.01)

(52) U.S. Cl.
CPC ...... *B01F 3/04262* (2013.01); *B01F 3/04496* (2013.01); *B01F 3/04836* (2013.01)

(58) Field of Classification Search
USPC ........... 261/79.2, 114.1, 114.2, 114.3, 114.4, 261/114.5
See application file for complete search history.

(56) References Cited

U.S. PATENT DOCUMENTS 4,578,153 A * 3/1986 Newton .................. B01D 3/18 202/158
4,750,975 A 6/1988 Parker et al.
5,120,474 A 6/1992 Binkley et al.
5,453,222 A 9/1995 Lee et al.
5,641,338 A * 6/1997 Brookman ........... B01D 47/021 261/114.1
5,885,488 A * 3/1999 Konijn .................... B01D 3/20 261/114.1
6,105,941 A * 8/2000 Buchanan ................ B01D 3/20 202/158
6,227,524 B1 * 5/2001 Kiselev .................... B01D 3/20 261/114.1
6,585,238 B1 * 7/2003 Erickson .................. B01D 3/20 261/114.1
6,682,633 B1 1/2004 Xu et al.
6,799,752 B2 * 10/2004 Wu ........................ B01D 3/163 261/114.2
7,270,316 B2 * 9/2007 Burch ...................... B01D 3/20 202/158
7,540,476 B2 6/2009 Piling et al.
7,708,258 B2 5/2010 Piling et al.
8,066,264 B2 11/2011 Griepsma et al.
8,720,870 B2 5/2014 Piling et al.
2004/0099970 A1 * 5/2004 Zich ......................... B01D 3/12 261/114.5
2004/0130041 A1 * 7/2004 Resetarits ................ B01D 3/20 261/79.2
2005/0001336 A1 * 1/2005 Buchanan ............. B01D 45/14 261/79.2
2007/0145612 A1 * 6/2007 Konijn ..................... B01D 3/20 261/114.5
2009/0134533 A1 5/2009 Griepsma et al.

* cited by examiner

HYBRID CONTACT TRAY FOR A MASS TRANSFER COLUMN

CROSS-REFERENCE TO RELATED APPLICATIONS

The present application is related to concurrently filed U.S. Provisional Patent Application Ser. No. 61/753,171, entitled HYBRID CONTACT TRAY FOR A MASS TRANSFER COLUMN, which is incorporated herein by reference for all purposes.

BACKGROUND

Mass transfer columns, such as distillation, absorption, and stripping columns, have been provided with various types of contact trays for vapor-liquid contact purposes. These columns are well known in the art for separation of a multi-component feed stream(s) and are not particularly limited herein. Examples of such columns and trays are described in U.S. Pat. Nos. 4,750,975; 5,120,474; 5,453,222; and 8,066,264, which are incorporated herein by reference.

Typically, a mass transfer column has a plurality of contact trays horizontally disposed in a spaced apart configuration over the height of the column. A typical contact tray has a deck over which a flow of liquid passes from an inlet downcomer section to an outlet downcomer. The typical tray deck has orifices through which an ascending vapor may flow and over which the liquid may flow in order to bubble or otherwise force the vapor through the liquid in cross-current flow.

A tray is designed to contact liquid and vapor and then allow their separation. In its simplest conceptual form, vapor flows up through holes in the tray deck and contacts liquid. The two disengage and liquid flows downward through the downcomer to the tray below and vapor flows up to the tray above. Since the vapor-liquid contact is intimate, there are mixtures of vapor and liquid almost everywhere on the tray. When operating under certain conditions, such as elevated pressure, mixing of liquid and vapor can result in the presence of froth (e.g. a mixture vapor and liquid) on the tray deck(s). Froth can buildup and flow into the downcomer carrying entrained vapor down through the downcomer and/or can flow upward through the holes of the tray above carrying entrained liquid. The efficiency and capacity of the tray and hence the column can be reduced by the occurrence of either event.

Design of distillation columns and their associated internals is a balance of overall material throughput and tray/column efficiency. Accordingly, it is an object of the invention to improve the capacity and efficiency of a tray for a mass exchange column.

SUMMARY OF INVENTION

In a first aspect, the present invention provides a hybrid contact tray for a mass transfer column. The contact tray comprises:

a tray deck for passage of liquid along a liquid flow path thereon, the tray deck having a plurality of orifices for passage of ascending vapor through the tray deck;

a cross-current vapor-liquid mixing section having a first portion of the plurality of orifices;

a co-current vapor-liquid mixing section comprising at least one co-current mixing device associated with a second portion of the plurality of orifices; and means for altering liquid head levels with respect to the plurality of orifices such that the liquid head level within the co-current vapor-liquid mixing section is greater than the liquid head level within the cross-current vapor-liquid mixing section.

In a second and third aspect, the present invention provides a mass transfer column comprising at least one hybrid tray described above and a method of separating at least one feed stream using the column.

DETAILED DESCRIPTION OF THE INVENTION

The present application is based upon the Inventors' discovery that mass transfer column operating capacity can be increased while maintaining or enhancing efficiency using one or more hybrid contact trays of the present invention in the column. The hybrid contact tray has a cross-current mixing section and a co-current mixing section disposed within a liquid flow path of the tray deck. Without being bound by a particular mechanism of operation, the present Inventors believe that use of a hybrid configuration of cross-current and co-current mixing sections allows vigorous mixing and intimate contact of liquid and vapor on the tray while reducing froth buildup which results from vigorous mixing. Furthermore, use of the present hybrid trays, and in particular the co-current mixing sections and devices, allow for increased vapor flows through the tray and column without reducing tray or column efficiencies.

Figure 1:
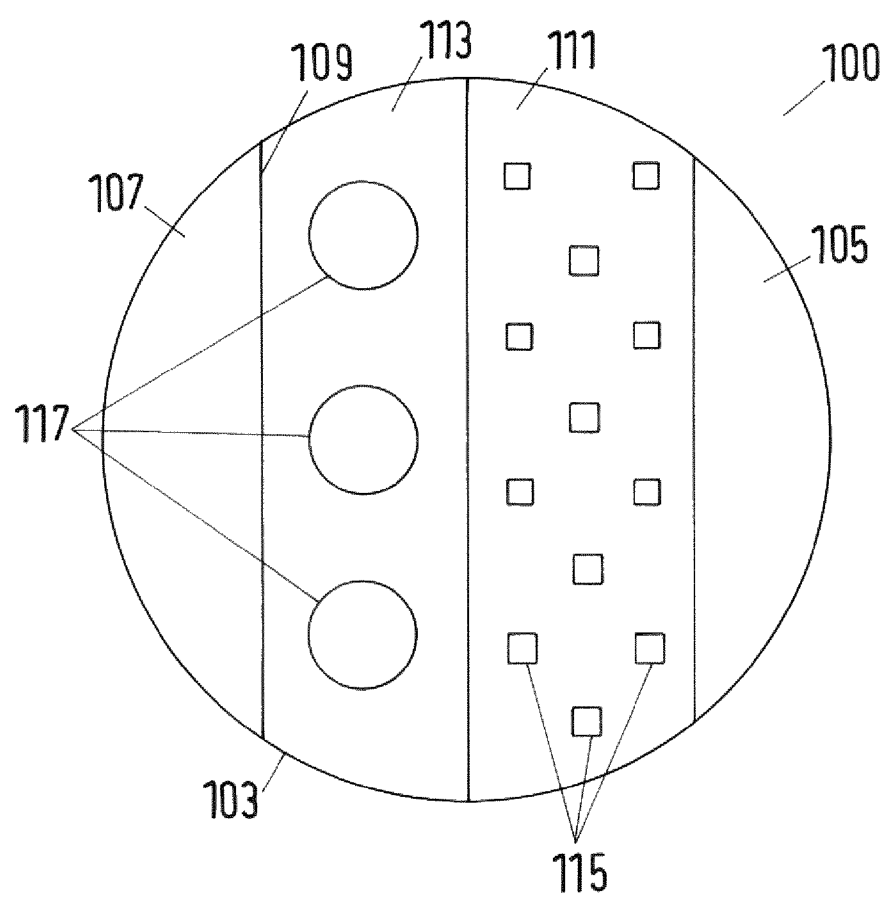
FIG. 1 is a top elevation view of a hybrid tray in accordance with the present invention.

In a first aspect the present invention provides a hybrid contact tray for a mass transfer column. Referring to the embodiments depicted in FIG. 1, the contact tray 100 has a tray deck 103 for passage of liquid along at least one liquid flow path thereon. The liquid flow path is from an inlet downcomer section 105 to an outlet downcomer section 107. The outlet downcomer section 107, as shown in FIG. 1, is typically a region of the tray where liquid spills over an outlet weir 109 (shown in FIG. 1 between co-current mixing section 113 and downcomer section 107) to the tray below. The tray deck 103 further has a plurality of orifices, which are shown in FIG. 1 to be associated with mixing devices (115, 117), for passage of ascending vapor through the tray deck 101.

The tray 100 is herein described as a "hybrid" contact tray in that the tray deck 103 has both a cross-current mixing section 111 and a co-current mixing section 113 disposed within a liquid flow path along the tray deck 103. In embodiments where the tray deck has an additional liquid flow path(s), it is preferred, but not required, that each additional path contains a cross-current mixing section and a co-current mixing section as described herein. The terms "co-current" and "cross-current" as used herein with respect to vapor-liquid mixing sections of the tray deck, and with respect to mixing devices disposed within these sections, describe the flow direction of liquid and vapor in relation to one another in or on the respective devices within the respective sections.

The Cross-Current Mixing Section:

In the cross-current mixing section 111, liquid traveling in the liquid flow path passes over a first portion of the plurality of orifices in the tray deck. Cross-current mixing devices may or may not be associated with the first portion of the plurality of orifices in the cross-current vapor-liquid mixing section 111. Where no mixing devices are associated with the orifices, the orifices themselves provide the vapor-liquid interface in the section as liquid passes directly over the orifice during operation. In some preferred embodiments, for example as shown in FIG. 1, the cross-current vapor-liquid mixing section 111 includes cross-current mixing devices 115 associated with a first portion of the plurality of orifices in the tray deck 103. The term "associated" as used herein means that the mixing device is disposed within the flow path of vapor through the orifice and within the liquid flow path along the tray deck 103 so as to disperse or contact vapor from the orifice in or with liquid. The mixing device 115 is preferably selected so as to minimize liquid that is traveling along the tray deck 103 from entering the orifice and falling to the tray below.

During operation of the tray shown in FIG. 1, vapor passes through the orifice associated with the mixing device 115 and then through the liquid in a direction different than (e.g. across, perpendicular to, or substantially perpendicular to) the liquid flow path. For example ascending vapor from the tray below passes through the orifice, interacts with the mixing device 115, and then bubbles through the liquid passing over the mixing device 115 and orifice. It is noted that the initial entry of vapor into the liquid may be in the direction of the flow path along the tray deck. However, after the initial vapor-liquid contact vapor travels in an upward direction from the tray deck which different than (e.g. across, perpendicular to, or substantially perpendicular to) the direction of the liquid path along the tray deck.

Cross-current mixing devices 115 are well known in the art and are not particularly limited herein. For example, cross-current mixing devices disposed within the cross-current mixing section can be static or fixed with respect to the tray deck. Static or fixed mixing devices include orifice caps covering at least a portion of the orifice which can be formed during formation of the orifice (e.g. by punching and/or bending) and/or inserted after the orifice has been formed. In other embodiments, cross-current mixing devices 115 can include dynamic or floating devices such as orifice caps which move (e.g. open and close) with respect to the tray deck and orifice depending on vapor flow rates and liquid head levels. In additional embodiments the cross-current mixing devices are positioned and/or have structural features which facilitate or otherwise control or enhance liquid flow and momentum along the tray deck and/or minimize liquid from entering the associated orifice and falling to the tray below. Non-limiting examples of preferred cross-current mixing devices 115 are described in U.S. Pat. Nos. 7,540,476, 7,708,258, 8,066,264 and 8,720,870, which are incorporated herein by reference for all purposes. In a preferred embodiment the cross-current mixing section 111 comprises at least one cross-current mixing device 115 as described in U.S. Pat. No. 8,720,870. In other preferred embodiments the cross-current mixing device(s) 115 is commercially available Valve selected from the group consisting of a Sulzer MVG valve, a Sulzer V-grid valve, a Koch-Glitsch Provalve, a standard round valve, and a bubble cap.

The Co-Current Mixing Section:

The co-current vapor-liquid mixing section 113 includes at least one co-current mixing device 117 associated with a second portion of the plurality of orifices in the tray deck 103. The co-current vapor-liquid mixing device preferably includes a conduit having a vapor inlet in fluid communication with one or more of the second portion of orifices; a froth inlet in fluid communication with the liquid flow path along the tray deck; a fluid outlet; and a co-current flow path for vapor and liquid/froth within the conduit disposed after the vapor and froth inlets and before the fluid outlet. The term "fluid communication" as used herein with reference to the vapor and froth inlets refer to their positioning with respect to the orifice and the liquid flow path on the tray deck 203. The vapor inlet 221 of the conduit 219 is disposed such that vapor can flow into the conduit 219 from the orifice. In some embodiments the vapor inlet may be the orifice itself. The froth inlet 223 of the conduit 219 is disposed such that liquid and liquid/vapor mixture (e.g. froth) can flow into the conduit 219 from the liquid flow path of the tray deck 203. In some embodiments the co-current vapor-liquid mixing section, the co-current vapor-liquid mixing device(s), the froth inlet(s), the means for altering liquid head levels, or any combination thereof, are selected and/or positioned so as to require most, all, or substantially all of the liquid traveling along the liquid flow path to pass through the co-current mixing device(s) in the co-current mixing section.

Packing Material Disposed Within the Co-Current Flow Path:

In one embodiment of the present invention, the co-current vapor-liquid mixing device is the same as the co-current vapor-liquid mixing device disclosed in concurrently filed U.S. Patent App. Ser. No. 61/753,171, entitled Hybrid Contact Tray for a Mass Transfer Column, which is incorporated herein by reference for all purposes.

Figure 2A:
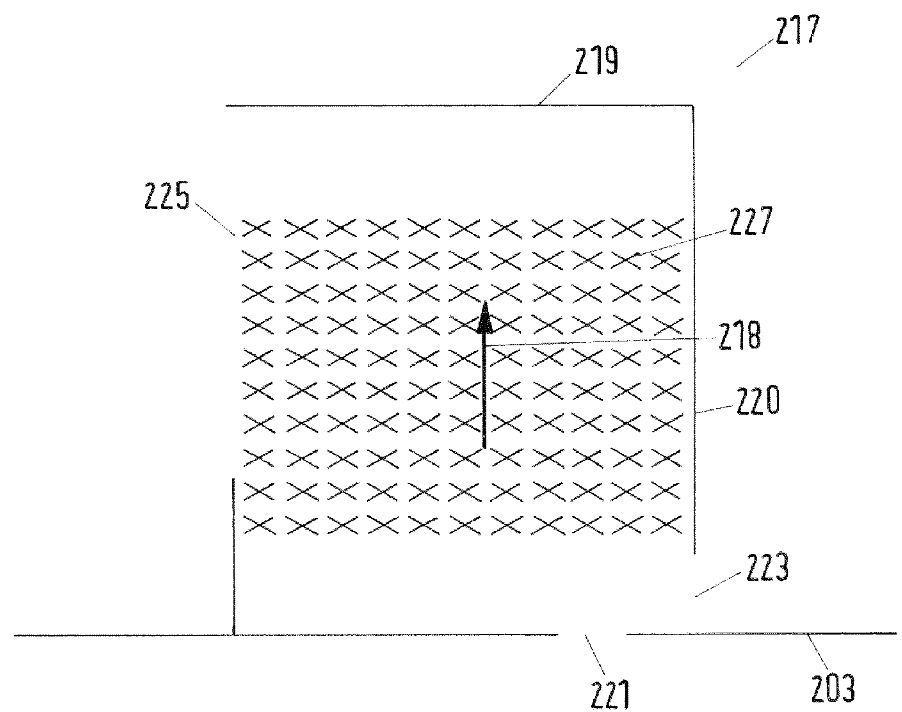
FIGS. 2A-2C are side elevation views of a co-current mixing device in accordance with the present invention.

Referring to the embodiments shown in FIG. 2A, the co-current mixing device 217 includes a conduit 219 wherein liquid/froth from the tray deck 203 and vapor from the second portion of orifices travel in co-current path 218 through at least part of the conduit 219. The dimensions and shape of the conduit 219 are not particularly limited (e.g. the conduit can have any particular cross-sectional shape for example rectangular or trapezoidal). In the embodiment shown in FIG. 2A, the conduit is enclosed by an outer wall 220 having a rectangular cross-section (e.g. a packing box) with openings for entry and exit of liquid/froth and vapor. The outer wall 220 of the conduit 219 has a vapor inlet 221 in fluid communication with one or more of the second portion of orifices. As shown in FIG. 2A the conduit 219 is disposed such that the vapor inlet 221 is an orifice in the tray deck 203. The conduit 219 also has a froth inlet 223 in fluid communication with the liquid flow path along the tray deck 203 and a fluid outlet 225. In preferred embodiments, both liquid and vapor exit the conduit 219 through the fluid outlet 225. However, the conduit may optionally include additional fluid outlet ports to allow exit of liquid and/or vapor. The fluid outlet(s) can be sized to control vapor and liquid velocities exiting the conduit (e.g. larger fluid outlet(s)=less velocity and vice versa).

The conduit 219 contains a packing material 227 disposed in the co-current vapor-liquid flow path 218 of the conduit 219 which is after the vapor and froth inlets 221, 223 and before the fluid outlet 225. The packing material is disposed entirely through a cross-section of the flow path 218 within the conduit such that the vapor and liquid are required to pass through the packing material 227. The packing material 227 increases the interfacial surface area between vapor and liquid within the conduit 219 and provides a region of intimate contact or coalescence between liquid and vapor. Non-limiting examples of packing materials 227 suitable for use in the conduit 219 include: a structured packing such as a corrugated and/or layered metal sheet or sheets (e.g. porous/perforated or non-porous/non-perforated sheet(s)) or woven and/or braided metal fibers; and a non-structured packing such as bundled or packed metal fiber (e.g. for example steel wool) or other durable material randomly packed into the conduit 219.

Figure 2B:
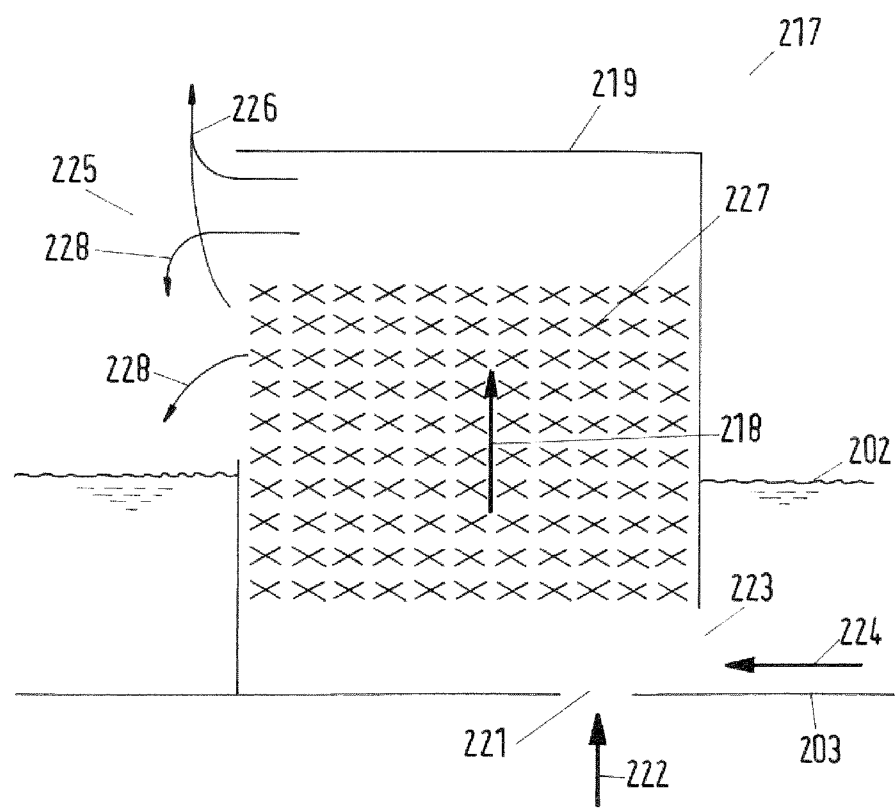

FIG. 2B shows the co-current mixing device 217 in operation in a mass transfer column where liquid/froth 202 is present on the tray deck 203 within the co-current mixing section. At least a portion of the liquid/froth present on the tray deck flows 224 into the froth inlet 223 of the conduit 219. Vapor flows 222 through the orifice of the tray deck 203/vapor inlet 221 of the conduit 219 from beneath the tray deck 203. The liquid and vapor mix as they travel in a co-current direction/flow path 218 through packing material 227 disposed within the conduit 219. Liquid and vapor then separate and exit the conduit 219 at the fluid outlet 225. Vapor ascends 226 to the tray above, while liquid returns 228 to the liquid 202 on the tray deck 203 and continues along the liquid flow path toward the downcomer section of the tray deck 203.

The conduit can be associated with one or more, for example two, three, or more, orifices in the tray deck. In a preferred embodiment the conduit is secured (e.g. via bolt, weld, rivet, and/or snap-fit connection, etc.) to the tray deck in a position directly covering the associated orifice(s). In this embodiment, the conduit has an opening or open side disposed toward the orifice(s) to allow vapor from the orifice to enter the conduit or the orifice itself can serve as the vapor inlet of the conduit.

Figure 2C:
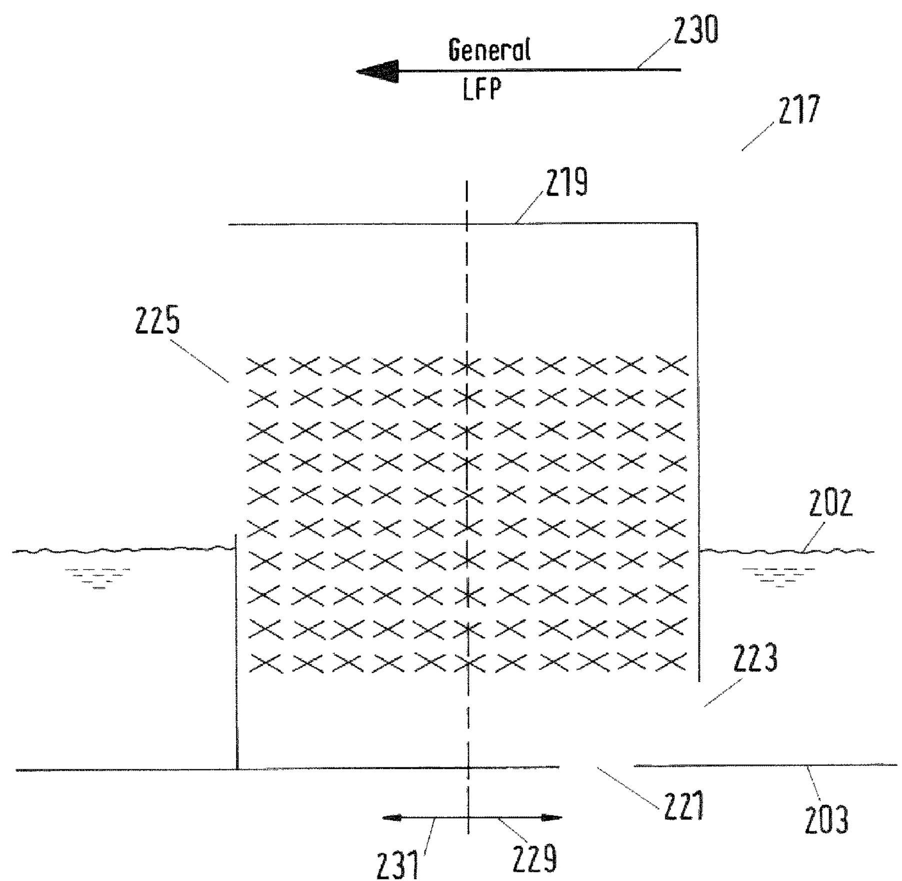

Referring now to the embodiments depicted in FIG. 2C, liquid flows in a liquid flow path 230 along the tray deck 203 within the co-current mixing section. The co-current mixing device 217 is disposed in the liquid flow path 230 such that the conduit 219 has an upstream side 229 and a downstream side 231. In this embodiment, the froth inlet 223 is disposed on the upstream side 229 of the conduit 219 and the fluid outlet 225 is disposed on the downstream side 231 of the conduit 219 and pointing in the direction of the liquid travel path of the tray deck. The present embodiment allows for stepwise movement of liquid 202 along the liquid flow path 230 of the tray deck 203. FIG. 2C shows another embodiment, where the vapor inlet 221 is also disposed on the upstream side 229 of the conduit 219. This embodiment is believed to encourage flow of both liquid/froth and vapor into the conduit 219 and efficient mixing through the co-current flow path in the device 217.

Figure 3A:
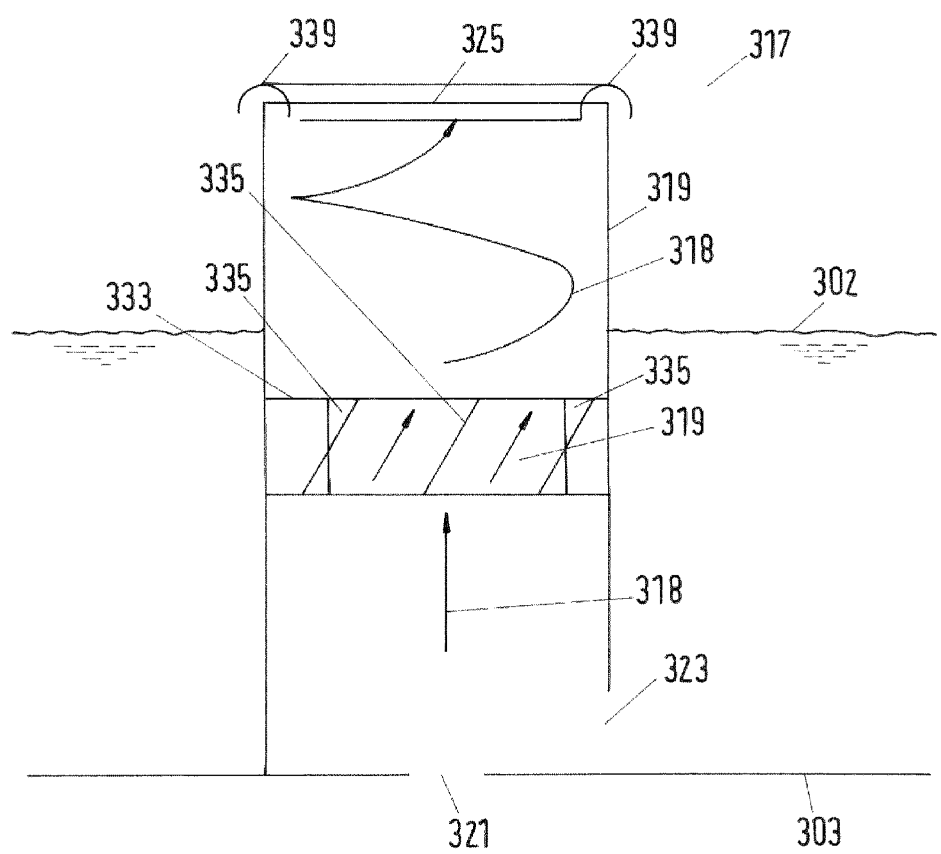
FIGS. 3A-3B are side elevation views of another co-current mixing device in accordance with the present invention.

Inertial Separation Device Disposed Within the Co-Current Flow Path:

In another embodiment the co-current vapor-liquid mixing device can employ a co-current mixing section for the interfacial contact of liquid and vapor and an inertial separation section for its subsequent separation by inertial forces. Referring now to FIG. 3A, the co-current mixing device 317 includes a conduit 319 wherein liquid 302 from the tray deck 303 and vapor from the second portion of orifices 321 travel in co-current path 318 through at least part of the conduit 319. In a preferred embodiment, the conduit has a cylindrically shaped outer wall and has openings for entry and exit of liquid/froth and vapor. The outer wall of the conduit 319 has a vapor inlet 321 in fluid communication with one or more of the second portion of orifices. As shown in FIG. 3A the conduit 319 is disposed such that the vapor inlet 321 is an orifice in the tray deck 303. The conduit 319 also has a froth inlet 323 in fluid communication with the liquid flow path along the tray deck 303 and a fluid outlet 325. In separate embodiments, the conduit 319 has more than one froth inlets, for example 2, 3, 4 or more froth inlets for receiving liquid/froth from the tray deck. In preferred embodiments, both liquid and vapor exit the conduit 319 through the fluid outlet 325. However, the conduit may optionally include additional fluid outlets to allow exit of liquid and/or vapor. The fluid outlet(s) can be sized to control vapor and liquid velocities exiting the conduit (e.g. larger fluid outlet(s)=less velocity and vice versa).

The conduit 319 contains an inertial separation device 333 disposed in the co-current vapor-liquid flow path 318 of the conduit 319 which is after the vapor and froth inlets 321, 323 and before the fluid outlet 325. The inertial separation device 333 is disposed such that it interacts with the vapor and liquid/froth traveling along the co-current vapor-liquid flow path 318 so as to bias fluid momentum of the flow path 318 against an internal portion of or structure within the conduit 319 (e.g. the conduit wall 319 as shown in FIG. 3). Heavier components (e.g. liquid) traveling in the flow path 318 have more momentum than lighter components (e.g. vapor) and will contact the conduit wall 319, separate from the lighter components, and continue to travel upward in the conduit along the conduit wall in the same general direction toward the fluid outlet 325 where they spill over the edge and fall back to the liquid 302 on the tray deck 303. In one embodiment the conduit 319 has a liquid director 339 disposed at the top edge of the conduit 319 wall for directing separated liquid traveling up the conduit wall and out of the fluid outlet back to the liquid 302 on the tray deck 303.

Inertial separation devices are known in the art for aiding separation of a multi-component streams, and are not particularly limited herein. As shown in FIG. 3A, the inertial separation device 333 preferably includes static blades 335 (e.g. fan or propeller blades) disposed within co-current liquid-vapor flow path 318 which bias fluid momentum toward the conduit wall 319. In this embodiment the inertial separation device creates a rotational flow (e.g. corkscrew or vortex) throughout the balance of the conduit 319 which promotes inertial separation of liquid from the vapor.

Figure 3B:
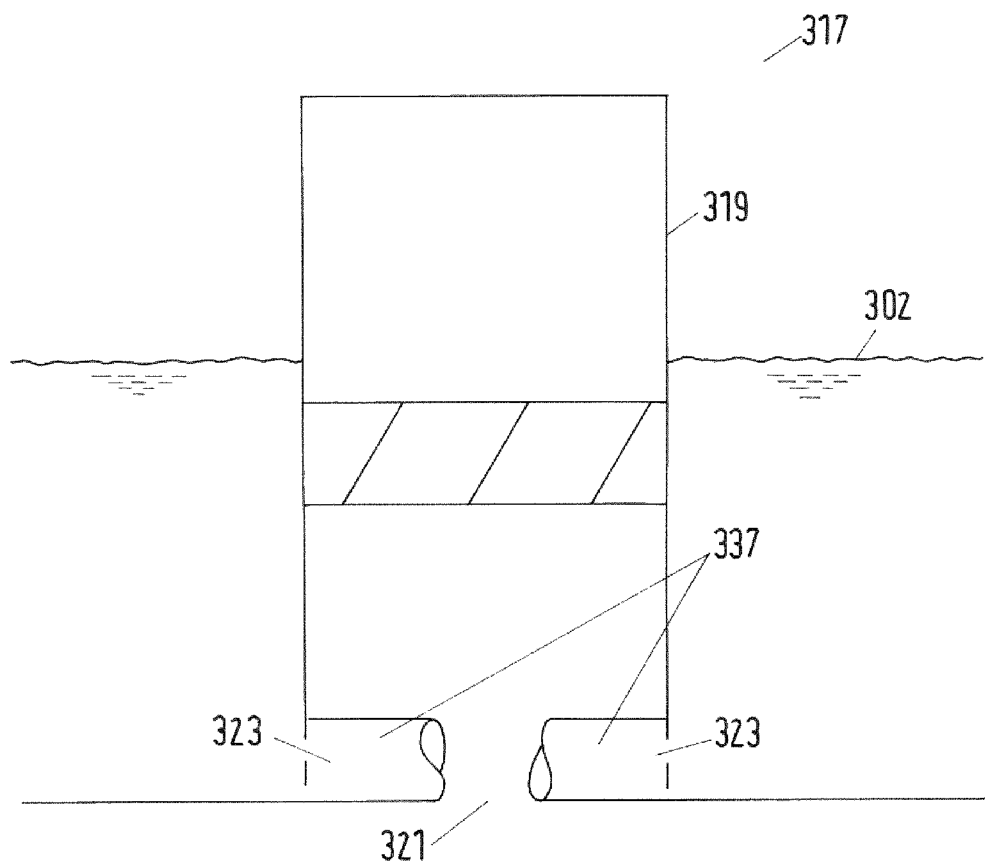

In a further embodiment as is shown in FIG. 3B, the conduit 319 includes a froth inlet distributor 337 in fluid communication with two, three, four or more, froth inlets 323 and the vapor inlet 321. The distributor 337 provides an enclosed (e.g. tube) or open (e.g. trough) flow path for liquid/froth to enter the conduit 319 to a position above, near, or adjacent to the vapor inlet 321 to contact ascending vapor. In the present embodiment shear forces caused by inlet vapor pressure, about the inlet distributor, provides instantaneous mixing and coalescence of vapor and liquid and is the start of the co-current flow path within the conduit 319.

Altering Liquid Head Levels Along the Tray Deck:

The present Inventors have discovered, that altering liquid and/or froth head levels with respect to orifices in different sections along the liquid flow path of the tray deck promotes the use of at least two different types of mixing devices (e.g. co-current and cross-current) on a single tray deck (e.g. the hybrid tray of the present invention). In most preferred embodiments, the froth inlet of the co-current mixing device is disposed such that the liquid/froth head level at the froth inlet of the co-current mixing device(s) is greater than greater the liquid/froth head level at the first portion of orifices (e.g. greater than the liquid head level in the cross-current mixing section). In most preferred embodiments the froth inlet of the co-current mixing device is disposed at a position within the liquid flow path at or near the tray deck to maximize liquid/froth head pressure at the froth inlet. In some embodiments the liquid/froth head level differential between the co-current and cross-current sections is selected such that the liquid/froth head level in the co-current mixing section is equal to or between 105% and 1000% (for example greater than or equal to 125%, 150%, 200%, 300%, 400%, and/or 500%) of the head level in the cross-current mixing section.

Altering the head levels with respect to the to the plurality of orifices such that the liquid/froth head level within the co-current vapor-liquid mixing section is greater than the liquid/froth head level within the cross-current vapor-liquid mixing section increases head pressure and liquid/froth flow into the froth inlet of the co-current mixing device. This has the benefit of maximizing interfacial contact and capacity of liquid and vapor on/through the tray thereby increasing operational capacity while maintaining or increasing efficiencies. Furthermore, maintaining the liquid/froth head level within cross-current mixing section at a lower level allows for use of conventional cross-current mixing sections, devices, and designs within the section. In preferred embodiments, the positioning, sizing, and/or flow rate of vapor through the vapor inlet and/or pressure drop within or across the co-current mixing device and/or positioning and/or selection the inertial separation device and/or packing material can be selected in combination with the liquid head differential between mixing sections so as to further promote liquid/froth flow into the co-current mixing device.

There are several different ways of altering liquid/froth head levels with respect to the first and second portions of the plurality orifices, and the ways of doing so are not particularly limited herein. In a first non-limiting embodiment the first portion of orifices may be raised with respect to the second portion of orifices to provide an elevation difference between the sections. In a second non-limiting embodiment the second portion of orifices may be lowered with respect to the first portion of orifices to provide an elevation difference between the sections. In a third non-limiting embodiment, the orifices may have the same elevation with respect to each other on the tray deck where devices, such as weirs, are present to create head differentials between sections and orifices. In a fourth non-limiting embodiment combinations of any of the first, second, and/or third embodiments may be employed.

Referring to the hybrid tray 401 embodiment depicted in FIG. 4, the general flow path of liquid 402 on the tray deck 403 is shown from an inlet downcomer section 405 (on the right) where liquid 402 is received from the tray above to an outlet downcomer section 407 (on the left) where liquid 402 exits the tray and flows to the tray below. In this embodiment, the tray deck 403 comprises a plurality of cross-current mixing sections 411 having cross-current mixing devices 415 associated with a first portion of orifices 420 and a plurality of co-current mixing sections 413 having co-current mixing devices 417 associated with a second portion of orifices 421. In the present embodiment, the tray deck 403 includes two step down regions which comprise the co-current mixing sections 413. The two step down regions which comprise the second portion of orifices 421 provide a liquid/froth head level differential with respect to the orifices where the liquid head level 441 in the co-current mixing section(s) is greater than the liquid head level 440 in the cross-current mixing section(s).

Figure 4:
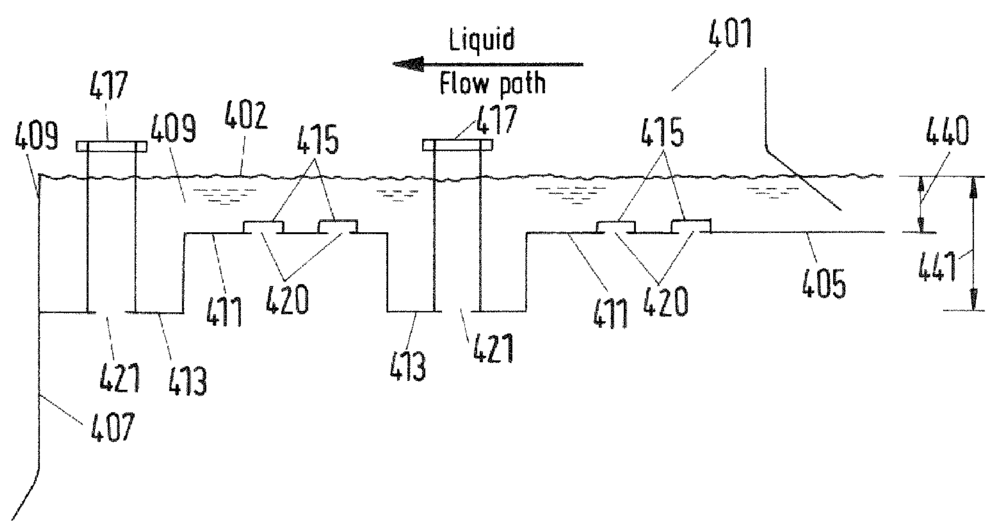
FIGS. 4-6 are side elevation views of different embodiments of hybrid trays in accordance with the present invention.

As shown in FIGS. 1 and 4, the co-current mixing sections can be aligned in rows disposed at oblique or perpendicular angles to the flow path on the tray deck. Furthermore, as shown in FIG. 4, liquid/froth levels along the flow path of the tray deck 403 may be further, or alternatively, controlled by use of intermediate and outlet weirs 409. Both weirs 409 depicted in FIG. 4 are selected so as to maintain a uniform liquid 402 surface while allowing liquid head level differentials in the respective mixing sections 411, 413. In other embodiments the outlet weir may be selected such that the liquid surface level in the final co-current mixing section is less than the liquid surface level in the balance of sections on the tray while still maintaining a liquid head level differential with respect to the orifices in the mixing sections 411, 413.

Weirs 409 may be selected to be of solid construction where liquid only spills over the top or they may be selected to have apertures or slots where liquid spills over the top and/or through slots or apertures within the weir 409. In a preferred embodiment the hybrid tray has a slotted or apertured outlet weir where liquid spills into the downcomer section of the tray deck and a solid intermediate weir where liquid spills over into a different section of the tray deck.

Depending on the size (e.g. diameter) of the column, and hence the size of the trays, it may be preferable to include more than one co-current mixing section and more than one cross-current mixing section (as shown in FIG. 4). However, in some embodiments only one co-current mixing section is present (as shown in FIG. 1). In some preferred embodiments, a co-current mixing section is the final vapor-liquid mixing section along the flow path of the tray before the liquid finally spills into the downcomer section of the tray and travels to the tray below. In other preferred embodiments, a co-current mixing section is disposed downstream from any cross-current mixing section of the tray deck.

Figure 5A:
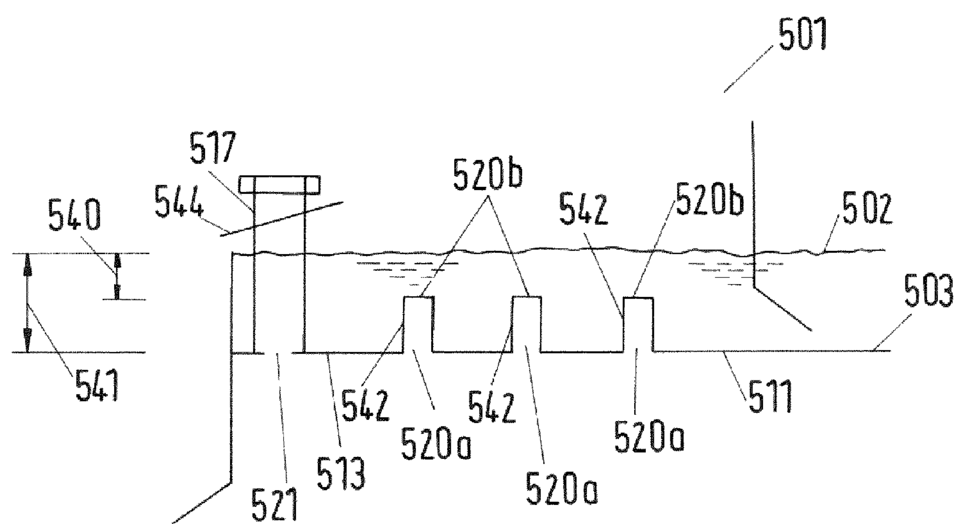

An alternative way of providing liquid/froth head level differential with respect to the orifices in the co-current and cross-current mixing sections is depicted in FIG. 5A. The hybrid tray 501 shown in FIG. 5A employs use of orifice extension tubes 542 disposed in or surrounding the first plurality of orifices 520*a* in the cross-current mixing section 511. Orifice extension tubes may be a conduit or tube which is secured (e.g. via bolt, weld, rivet, and/or snap-fit connection, etc.) to the tray deck in a position directly covering/surrounding the associated orifice(s). The orifice extension tubes 542 allow for extension of the orifice 520*a* (e.g. the vapor-liquid interface) to a new position/orifice 520B which is intermediate the tray deck 503 and the liquid surface 502. Any of the cross-current mixing devices described above may optionally be associated with the new extended orifice(s) 520B. Use of orifice extension tubes 542 provides the required liquid head level differentials 540, 541 between the cross-current mixing section 513 and co-current mixing section 511 by physically altering the elevation of the first portion of orifices with respect to the second portion of orifices. This embodiment allows for manufacture of a single elevation tray deck without intermediate or terminal step-down regions as described above. Alternatively, this embodiment allows for retrofitting existing tray deck(s) (e.g. basic sieve trays) currently in use in industrial columns so as to provide those columns and one or more trays therein with the herein described benefits. For example, once designed and manufactured for an existing column, the cross-current mixing device(s) 517 and orifice extension tubes 542 can be provided to a customer or service provider for installation into the column.

FIG. 5A shows another embodiment where the co-current mixing device 517 comprises a effluent liquid collection collar 544. Collar 544 surrounds the conduit and is disposed to collect and direct liquid exiting the conduit to a position or different section further down the liquid flow path (e.g. toward or directly into the downcomer outlet section) of the tray deck 503 and can be used to promote liquid flow along the tray deck. In this embodiment Collar 544 can be used to provide liquid which has already been contacted with vapor in the co-current mixing device/section to a downstream section thereby preventing the "already contacted" liquid from being combined liquid/froth still to enter the co-current mixing device.

Figure 5B:
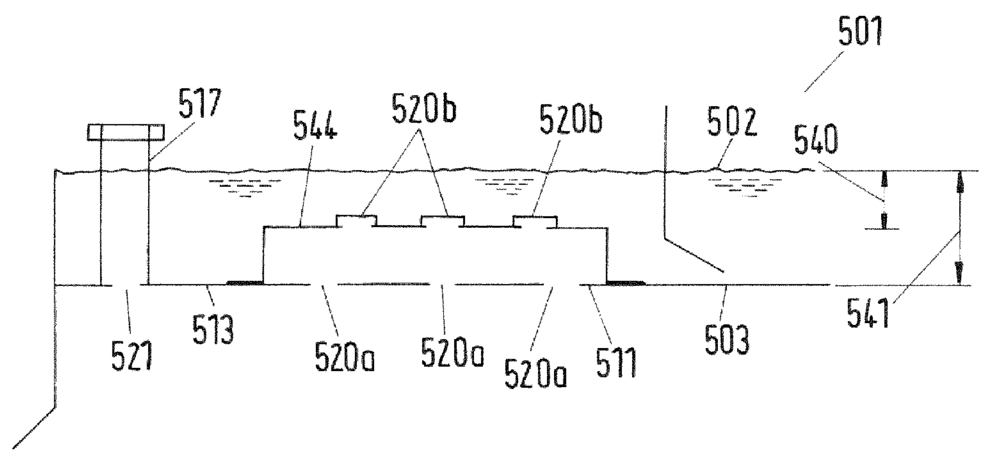

FIG. 5B shows a further way of providing liquid head level differential with respect to orifices in the co-current 513 and cross-current 511 mixing sections. The hybrid tray 501 employs use of an enclosed orifice extension box 544 covering/enclosing the first plurality of orifices 520*a* in the cross-current mixing section 511. The orifice extension box 544 itself has orifices 520*b* in its top surface which effectively allow for extension of the orifices/vapor-liquid interface from the orifice 520*a*/tray deck 503 to a new position/orifice 520B which is intermediate the tray deck 503 and the liquid surface 502. Any of the cross-current mixing devices described above may optionally be associated with the new extended orifice(s) 520B. Orifice extension box 544 is secured (e.g. via bolt, weld, rivet, and/or snap-fit connection, etc.) to the tray deck in a position directly covering the associated orifice(s) 520*a*. Use of orifice extension box 544 provides the required liquid/froth head level differentials 540, 541 between the cross-current mixing section 513 and co-current mixing section 511 by providing a step-up region on the tray deck. Like the embodiment depicted in FIG. 5A, the present embodiment allows for manufacture of a single elevation tray deck without intermediate or terminal step-down regions as described above. Similarly this embodiment allows for retrofitting of existing tray decks (e.g. basic sieve trays) currently in use in industrial columns so as to provide those columns and trays with the herein described benefits.

Figure 6:
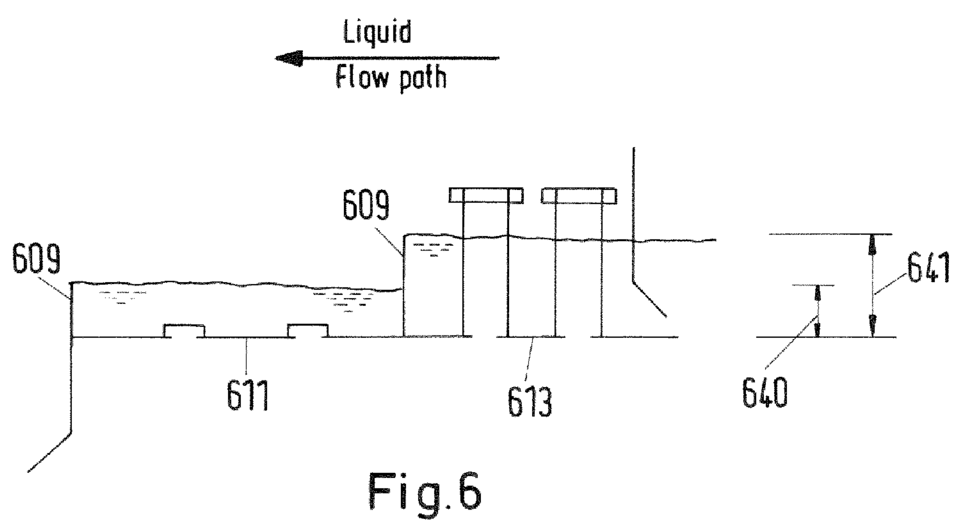

Another way of providing the herein described liquid head level differentials with respect to the orifices in the co-current and cross-current mixing sections is depicted in FIG. 6. As shown in this embodiment, a combination of weirs 609 with different heights and/or other functional characteristics (e.g. aperture or slots) can be employed. As shown in FIG. 6, the co-current mixing section 613 is located upstream from and has a greater liquid head level than the cross-current mixing section 611. This is accomplished by separation of the respective sections by a higher and/or solid intermediate weir and a shorter and/or apertured or slotted outlet weir.

Figure 7A:
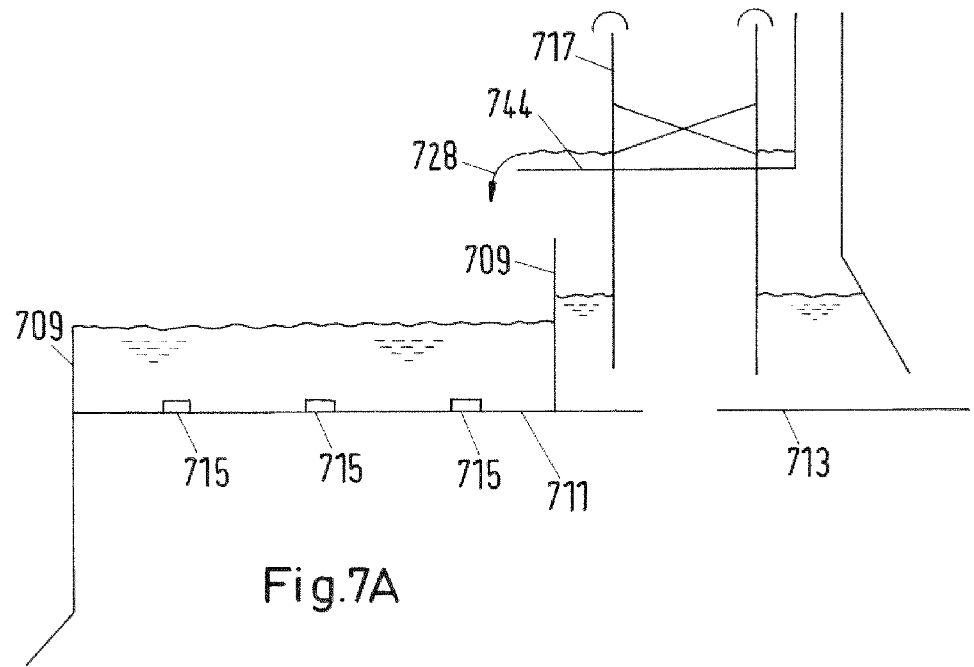
FIGS. 7A-7B are side elevation views of different embodiments of hybrid trays in accordance with the present invention.
Figure 7B:
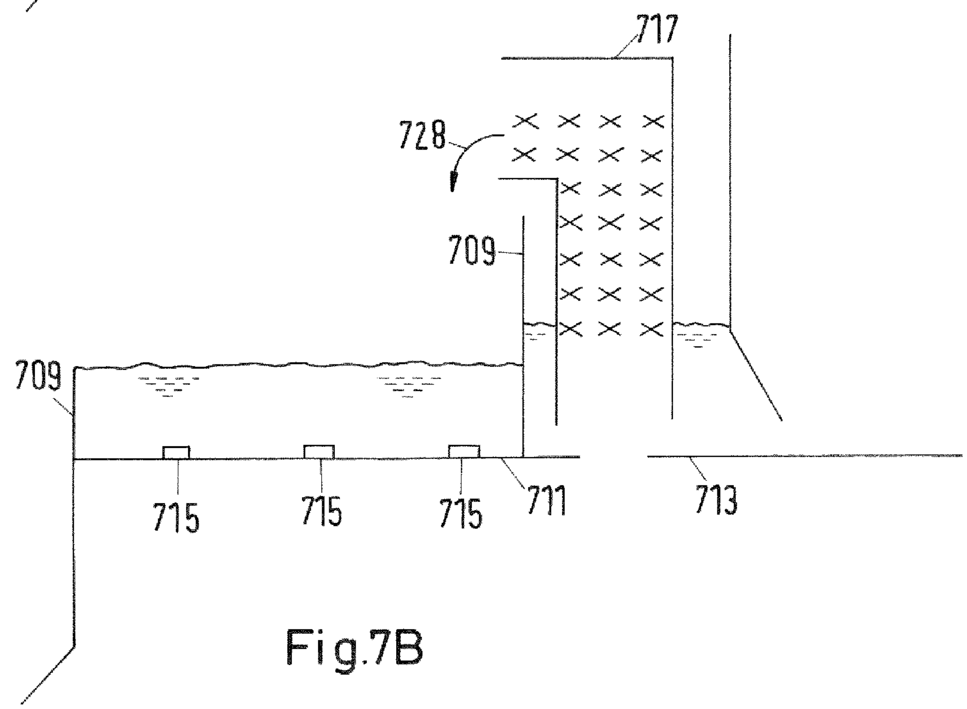

FIGS. 7A and 7B show additional embodiments for providing the herein described liquid head level differentials with respect to the orifices in the co-current 713 and cross-current 711 mixing sections. As shown in this embodiment, a combination of weirs 709 with different heights and/or other functional characteristics (e.g. aperture or slots) are employed to provide the liquid/froth head differentials between sections 711, 713. The co-current mixing section 713 is located upstream from and has a greater liquid head level than the cross-current mixing section 711. This is accomplished by separation of the respective sections by a higher and/or solid intermediate weir and a shorter and/or apertured or slotted outlet weir. In FIG. 7A the co-current mixing device 717 contains an inertial separation device while the co-current mixing device 717 in FIG. 7B contains a packing material. In both FIGS. 7A and 7B, the co-current mixing devices 717 contain a fluid outlet alone or in combination with a liquid collection collar 744 which direct liquid exiting 728 the co-current mixing device 717 over the intermediate weir 709 to a downstream section of the tray (e.g. to the counter-current mixing section 711). In these embodiments all of the liquid/froth entering the co-current mixing section 713 (e.g. via the inlet downcomer as shown in these figures) is required to pass through the co-current mixing device(s) 717. After the liquid is contacted with vapor in the co-current device it exits and is directed to a downstream section thereby preventing it from being recombined with liquid/froth awaiting entry into or processing by the co-current device 717.

Without being bound by a particular mechanism, it is believed that use of the presently described hybrid contact trays allow for increased interfacial contact of vapor and liquid on/through the tray and allows for greater operational capacity while maintaining or enhancing efficiencies. It is further believed that use of the co-current mixing section(s) and device(s) are effective to reduce froth content on the tray deck further allowing for increased operational capacity.

In the embodiments shown in the present Figures, the trays have a single liquid flow path thereon. In other embodiments still in accordance with the present invention, the tray(s) may have more than one liquid flow path thereon (e.g. the tray(s) may have more than one inlet downcomer section and/or more than one outlet downcomer section). For example, a tray may have two or more inlet downcomer sections disposed toward the outer periphery of the tray for receiving liquid from the tray above, and one or more outlet downcomer sections disposed toward the interior of the tray to provide liquid to the tray below. In another example, a tray may have one or more inlet downcomer sections disposed toward the interior of the tray for receiving liquid from the tray above, and two or more outlet downcomer sections disposed toward the outer periphery of the tray to provide liquid to the tray below. In these examples, each tray has more than one liquid flow path extending between a respective inlet downcomer section and a respective outlet downcomer section. At least one, and more preferably all, liquid flow paths on the tray will contain both a cross-current and a co-current mixing section as described herein.

Mass Transfer Columns and Methods of Operation:

The hybrid contact trays of the present invention are intended for use in mass transfer columns. Hence in a further aspect, the present invention provides a mass transfer column comprising one or more hybrid contact trays according to any herein described embodiment. The tray(s) are arranged horizontally in a spaced apart configuration along the height of the column so that liquid enters the tray at its inlet downcomer section(s) from higher in the column and exits the tray at its outlet downcomer section to a position lower in the column. The hybrid contact tray(s) can be employed in a column optionally in combination with packing materials/sections and/or with other types of trays such as those having only cross-current mixing sections (e.g. sieve trays, valve trays, and/or cap trays, etc.) and/or only co-current mixing sections (e.g. trays having co-current mixing devices such as those herein described). In preferred embodiments the column will have a plurality of horizontally disposed contact trays wherein at least 50%, for example at least 75%, and optionally 100%, of the trays include a hybrid tray according to any herein described embodiment.

The hybrid trays of the present invention can be arranged within the column in horizontal groupings of two or more hybrid trays or alternated with different types of trays and/or packing sections along the height of the column. Where the column has more than one hybrid tray according to the present invention (e.g. where several hybrid trays are arranged in a horizontal grouping) the hybrid trays can have different characteristics from one another (e.g. different liquid flow paths and/or directions, different configurations of mixing sections within the liquid flow paths so as to vertically offset the mixing sections and or devices, different amount of orifices disposed in the mixing sections, different packing materials in packed conduits, different weir heights, and different fluid outlet configurations, etc.). For example, where the hybrid contact trays have a single liquid flow path from an inlet downcomer section to an outlet downcomer section, the hybrid trays may be alternated with each other or other types of trays so the outlet downcomer section of one tray provides liquid to the inlet downcomer section of the tray below to provide an overall zig-zag liquid flow pattern down through the column. In a further example where the trays have more than one liquid flow path (e.g. more than one inlet and/or downcomer section) the trays are preferably alternated so as to provide liquid from a tray having one or more outlet downcomer sections disposed toward the interior of the tray to a tray below having an inlet downcomer section disposed toward interior of the tray.

In another embodiment, an existing conventional mass transfer column can be retrofit to include one or more hybrid contact trays according to any embodiment described herein. The decision to retrofit an existing column can be made to increase capacity of the column without having to incur the cost of entire column design and replacement.

The present invention also provides a method of producing an overhead stream and a bottoms stream from one or more feed streams. Other streams such as side product stream(s) or secondary feed streams can be provide to or removed from the column. The method includes a first step of introducing one or more feed streams to a mass transfer column having a horizontally disposed hybrid contact tray according to any embodiment herein described. A second step includes, treating the one or more feed streams under operating conditions within the column sufficient to create an overhead stream and a bottoms stream.

Operation of mass transfer columns are well known in the art and operating conditions are not particularly limited. In one embodiment, the Inventors have found the hybrid contact trays described herein to be particularly useful in a column operating under elevated pressure (e.g. where the column and/or feed streams are pressurized). The term "elevated pressure" is herein understood to mean an operating pressure above normal atmospheric pressure (e.g. a pressure above 1 atm absolute). In some embodiments, the operating pressure is more than 2 atm absolute, more than 5 atm absolute, or more than 10 atm absolute. Without being bound by a particular mechanism, it is believed that columns operating under elevated pressure are more likely to have froth build up on the horizontally disposed trays. The hybrid contact trays of the present invention, and in particular use of the co-current mixing sections and devices are, inter alia, particularly useful for minimization of froth by separation thereof into its components parts. This allows greater efficiency and material throughput of each hybrid contact tray as well as in the column itself. Furthermore, use of the present hybrid trays, and in particular the co-current mixing sections and devices, allow for increased vapor flows through the tray and column without increasing operational costs or reducing efficiencies.

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner with any other of the various embodiments.

The invention claimed is:

1. A hybrid contact tray for a mass transfer column, the hybrid contact tray comprising:

a tray deck for passage of liquid along a liquid flow path thereon, the tray deck having a plurality of orifices for passage of ascending vapor through the tray deck;

a cross-current vapor-liquid mixing section having a first portion of the plurality of orifices;

a co-current vapor-liquid mixing section comprising at least one co-current mixing device associated with a second portion of the plurality of orifices; and means for altering liquid head levels with respect to the plurality of orifices such that the liquid head level within the co-current vapor-liquid mixing section is greater than the liquid head level within the cross-current vapor-liquid mixing section.

2. The hybrid contact tray according to claim 1, wherein the co-current vapor-liquid mixing device comprises a conduit having: a vapor inlet in fluid communication with one or more of the second portion of orifices; a froth inlet in fluid communication with the liquid flow path along the tray deck; a fluid outlet; and a co-current flow path of vapor and liquid within the conduit disposed after the vapor and froth inlets and before the fluid outlet.

3. The hybrid contact tray according to claim 2, wherein the conduit has a packing material disposed within the co-current flow path of vapor and liquid.

4. The hybrid contact tray according to claim 3, wherein the packing material is selected to increase interfacial surface area between the vapor and liquid in the conduit.

5. The hybrid contact tray according to claim 4, wherein the packing material is selected from the group consisting of: a corrugated metal sheet, woven metal fibers, braided metal fibers, and randomly bundled metal fibers.

6. The hybrid contact tray according to claim 2, wherein the conduit comprises an inertial separation device disposed within the co-current flow path of vapor and liquid within the conduit, wherein the inertial separation device biases the co-current flow path of vapor and liquid toward an interior wall.

7. The hybrid contact tray according to claim 6, wherein the froth inlet comprises a tube or trough disposed within the conduit that is in fluid communication with both the liquid flow path along the tray deck and vapor inlet to provide a flow path of liquid within the conduit to the vapor inlet.

8. The hybrid contact tray according to claim 1, wherein the cross-current vapor-liquid section comprises cross-current mixing devices associated with the first portion of the plurality of orifices.

9. The hybrid contact tray according to claim 8, wherein the cross-current mixing devices are orifice caps which are positioned within the liquid flow path at a fixed height with respect to the tray deck or change height with respect to the tray deck.

10. The hybrid contact tray according to claim 1, wherein the means for altering liquid head levels comprises a step-down region in the tray deck along the liquid flow path, wherein the step-down region comprises the co-current mixing section.

11. The hybrid contact tray according to claim 1, wherein the means for altering liquid head levels comprises a step-up region in the tray deck along the liquid flow path, wherein the step-up region comprises the cross-current mixing section of the tray deck.

12. The hybrid contact tray according to claim 1, wherein the means for altering liquid head levels comprises a cross-current mixing device comprising orifice extension tubes disposed within or surrounding the each of the first plurality of orifices, wherein during operation the orifice extension extend the orifice to a position intermediate the tray deck and the liquid surface level on the tray.

13. The hybrid contact tray according to claim 1, wherein the means for altering liquid head levels comprises a combination of weirs disposed in the liquid flow path along the tray deck, the combination of weirs comprising an intermediate weir disposed between the co-current and cross-current mixing sections, and an outlet weir disposed between the final mixing section and an outlet downcomer section.

14. The hybrid contact tray according to claim 13, wherein the intermediate weir is solid wherein liquid traveling along the liquid flow path flows over the intermediate weir, and wherein the outlet weir comprises apertures and/or slots wherein liquid traveling along the liquid flow path flows through the apertures and/or the slots.

15. The hybrid contact tray according to claim 1, wherein the liquid flow path along the tray deck is from an inlet downcomer section to an outlet downcomer section, wherein the cross-current and the co-current vapor-liquid mixing sections are disposed along the liquid flow path between the inlet downcomer section and the outlet downcomer section.

16. The hybrid contact tray according to claim 1, wherein the cross-current vapor-liquid mixing section and the co-current vapor-liquid mixing section are positioned relative to the liquid flow path along the tray deck such that the cross-current vapor-liquid mixing section is disposed upstream from the co-current vapor-liquid mixing section.

17. A mass transfer column with a hybrid contact tray comprising:

a tray deck for passage of liquid along a liquid flow path thereon, the tray deck having a plurality of orifices for passage of ascending vapor through the tray deck;

a cross-current vapor-liquid mixing section having a first portion of the plurality of orifices;

a co-current vapor-liquid mixing section comprising at least one co-current mixing device associated with a second portion of the plurality of orifices; and means for altering liquid head levels with respect to the plurality of orifices such that the liquid head level within the co-current vapor-liquid mixing section is greater than the liquid head level within the cross-current vapor-liquid mixing section.

18. A method of producing an overhead stream and a bottom stream from one or more feed streams, the method comprising the steps of:

(i) introducing one or more feed streams to a mass transfer column a hybrid contact tray comprising:

a tray deck for passage of liquid along a liquid flow path thereon, the tray deck having a plurality of orifices for passage of ascending vapor through the tray deck;

a cross-current vapor-liquid mixing section having a first portion of the plurality of orifices;

a co-current vapor-liquid mixing section comprising at least one co-current mixing device associated with a second portion of the plurality of orifices; and means for altering liquid head levels with respect to the plurality of orifices such that the liquid head level within the co-current vapor-liquid mixing section is greater than the liquid head level within the cross-current vapor-liquid mixing section, (ii) treating the mass transfer column under operating conditions sufficient to create a tops stream and a bottoms stream, thereby producing an overhead stream and a bottoms stream from one or more feed streams.

19. The method of claim 18, wherein the operating conditions in step (ii) include an operating pressure above atmospheric pressure.

* * * * *